Aug. 15, 1944.  C. A. JOHNSON ET AL  2,355,733
PIPE CLEANING DEVICE
Filed March 15, 1941      8 Sheets-Sheet 1

INVENTORS
Glenn F. Buys
Charles A. Johnson
BY
Barnes, Kisselle, Laughlin & Raisch
Attorneys.

Aug. 15, 1944.　　C. A. JOHNSON ET AL　　2,355,733
PIPE CLEANING DEVICE
Filed March 15, 1941　　8 Sheets-Sheet 3

INVENTORS
Glenn E. Buys
Charles A. Johnson
BY Barnes, Kisselle, Laughlin & Kisselle
ATTORNEYS Aug. 15, 1944.  C. A. JOHNSON ET AL  2,355,733
PIPE CLEANING DEVICE
Filed March 15, 1941   8 Sheets-Sheet 5

INVENTORS
Glenn E. Buys
Charles A. Johnson
BY Barnes, Kisselle, Laughlin & Raisch
Attorneys.

Aug. 15, 1944.                C. A. JOHNSON ET AL                 2,355,733
                                PIPE CLEANING DEVICE
                             Filed March 15, 1941          8 Sheets-Sheet 8

INVENTORS
Glenn E. Buys
Charles A. Johnson
BY Barnes, Kisselle, Laughlin & Raisch
Attorneys.

Patented Aug. 15, 1944

2,355,733

UNITED STATES PATENT OFFICE 2,355,733

PIPE CLEANING DEVICE

Charles A. Johnson and Glenn E. Buys, Flint, Mich.; said Johnson assignor to said Buys Application March 15, 1941, Serial No. 383,508

19 Claims. (Cl. 15—104.30)

This invention relates to an improved pipe-cleaning device adapted to clean and remove obstructions from sewers, drains, and the like.

In devices of this character, it has been common to use a flexible cable provided with a cutting element. Penetration of the cable and cutting element into the pipe has been utilized to remove obstructions and clean the pipe. It is desirable to rotate this cable as well as feed it longitudinally through the pipe. Prior devices have proved dangerous and unsatisfactory in that they have necessitated the operator's handling of the rotating flexible cable. Many prior devices utilized power means to rotate the flexible cable, but required the operator to manually feed the rotating cable into the pipe. It is dangerous to touch the rotating cable, and when the rotating cable has encountered obstructions in the pipe it has been found that it possesses a tendency to whip or snap and injure the operator. An aim of the present invention is to provide a pipe-cleaning device that removes these hazards to the operator.

In the operation of a pipe-cleaning device it is also necessary to provide a device capable of passing through sharp angles and obstructions in the pipe. The particular motion imparted to the flexible cable by the present device is peculiarly adapted to feed the flexible cable around corners and the like in the pipe. This motion referred to is a continuous rotation of the flexible cable and an intermittent longitudinal motion. It has been found desirable not to reverse the direction of rotation of the flexible cable when it is desired to retract the flexible cable and remove it from the pipe. Thus only the longitudinal movement is reversed. This permits the cutter to cut a separate path of an opposite helix on its retraction and more thoroughly clean the pipe.

To increase the safety features of this device a remote control and sheathed cable are provided. This permits the operator to stand adjacent the entrance to the pipe and operate the machine by means of controls in his hand. The live cable, however, progressing from the machine into the pipe is completely covered and inaccessible to the operator. This prevents the operator from being injured and obviates the necessity of moving the device up to the entrance to the pipe.

A means is also provided to prevent the cable from being forced back into the machine when the cable encounters an obstruction in the pipe.

A further object of this device is to facilitate repairs by mounting the drive means in an integral removable unit. This permits a ready removal of the drive means and substitution of a replacement drive means as an integral unit when parts become worn. The drive means contains the parts most likely to wear out.

Other objects and advantages of the invention will be described herein.

Figures 1, 2:
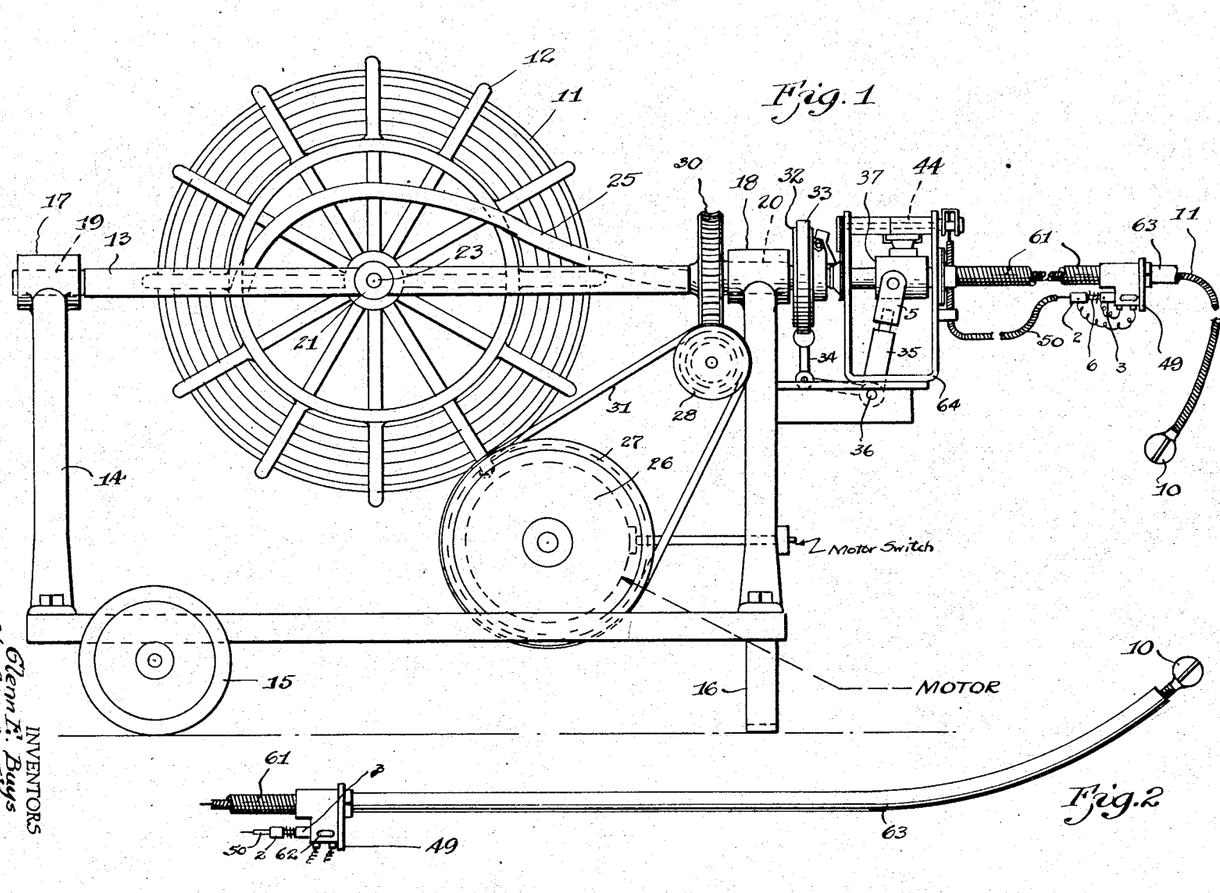
Fig. 1 is a side elevation of the complete machine.
Fig. 2 is an enlarged view of the remote control and the conduit, protecting the operator from the cable at its entrance into the sewer or pipe.

Fig. 1 shows a side view of the device comprising a cutting element 10 on a flexible cable 11, which is wound within a reel 12 mounted on a frame 13. Drive means is interposed between the reel and cutting element.

The device is preferably mounted upon a portable supporting structure 14 provided with a pair of wheels 15 and a stand 16. The supporting structure is provided with co-axial bearings 17 and 18. The rectangular frame 13 is provided with journals 19 and 20 upon its longitudinal axis. The frame 13 is rotatably mounted in the supporting structure 14, and the journals 19 and 20 are rotatably received by the bearings 17 and 18. The internally wound circular reel 12 provided with journals 23 and 24 is rotatably mounted in the frame 13 by the journals 23 and 24 which are received in the bearings 21 and 22 respectively. The flexible cable 11 is wound within the reel 12 and one end of the cable extends from the reel through a guide member 25 and through an opening in the journal 20 to be received within the drive mechanism and fed into the sewer or pipe.

Suitable power means shown as an electric motor 26 is adapted to rotate the entire frame 13. This rotation is effected by a pulley wheel 27 mounted upon the shaft of the electric motor, and a pulley wheel 28 provided with a worm 29 adapted to engage worm gear 30 on the frame 13. A suitable belt 31 connects the pulley wheels 27 and 28. Thus rotation of the armature of the electric motor rotates pulley wheels 27 and 28 which rotate the frame 13 and impart to the flexible cable extending into the drive means a rotating movement.

The freely rotatable reel permits longitudinal movement of the rotating flexible cable. A drive means is provided to longitudinally feed the rotating cable into the pipe. The longitudinal movement to be given to the cable is peculiar in that it is intermittent. This has been found to facilitate the progress of the cable and cutter around sharp corners in the pipe. The driving means adapted to give the cable this motion comprises an eccentric 32 keyed to the hollow rotatable journal 20. The periphery of this eccentric is circular, and a slip ring 33 is mounted thereon. Pivotally mounted upon the slip ring 33 is a link 34. It will thus be seen that rotation of the hollow journal or shaft 20 will rotate the eccentric 32 and cause reciprocating vertical motion in the link 34. A bell crank 35 is pivotally mounted on a portion of the supporting member at 36. One leg of bell crank 35 is pivotally fastened to the link 34. A bifurcated yoke 5 is slidably mounted on the other leg of the bell crank 35. The bifurcated yoke is pivotally fastened to a sleeve 37, slidably mounted concentric with the cable. It is, therefore, apparent that the vertical reciprocation of link 34 causes the sleeve 37 to reciprocate horizontally as shown in Fig. 1.

Figure 5:
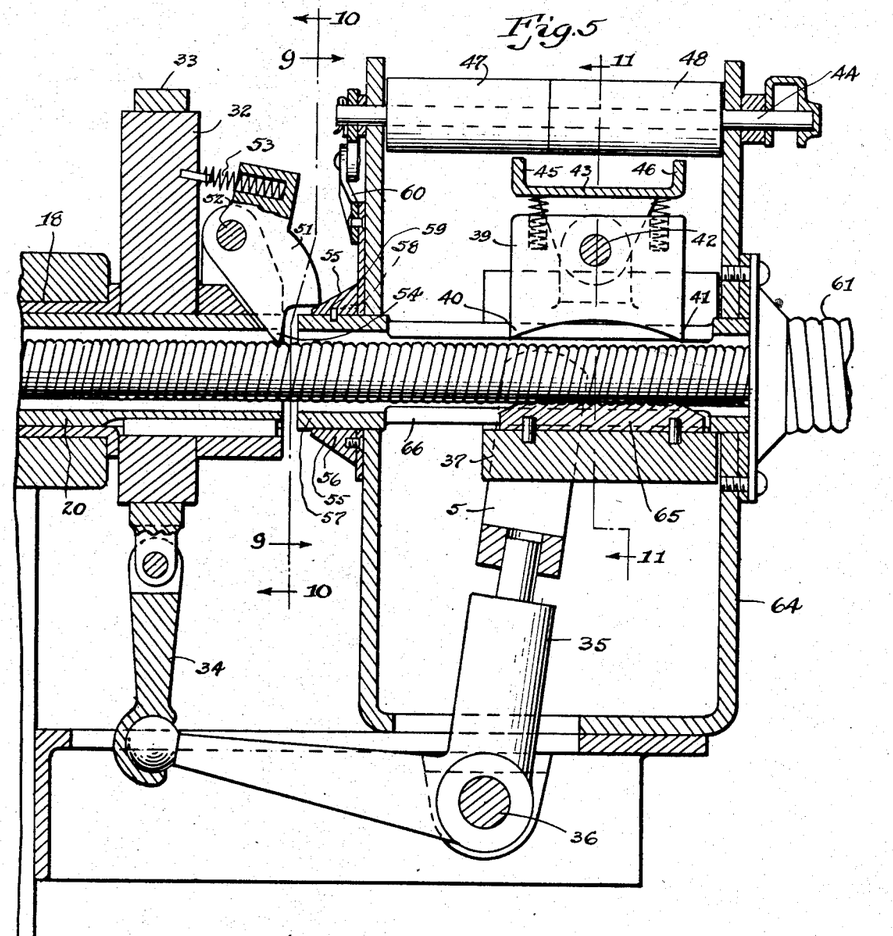
Fig. 5 is a section on the line 5—5 of Fig. 4, showing the feeding mechanism in neutral or inoperative position.

The sleeve 37 is provided with a vertical slot adapted to receive a dog 39 provided with oppositely directed teeth 40 and 41 which engage the cable alternately. The dog 39 is pivotally mounted within the sleeve 37 upon a shaft 42. A U-shaped plate 43 is also pivotally mounted upon the shaft 42. Coil springs 44 and 45 resiliently engage plate 43 and dog 39. Fig. 5 shows the dog and plate 43 in neutral position with teeth 40 and 41 out of engagement with the cable. Camming the dog downward at either end will determine the direction of longitudinal movement of the cable as illustrated in Figs. 6 and 7.

Figure 6:
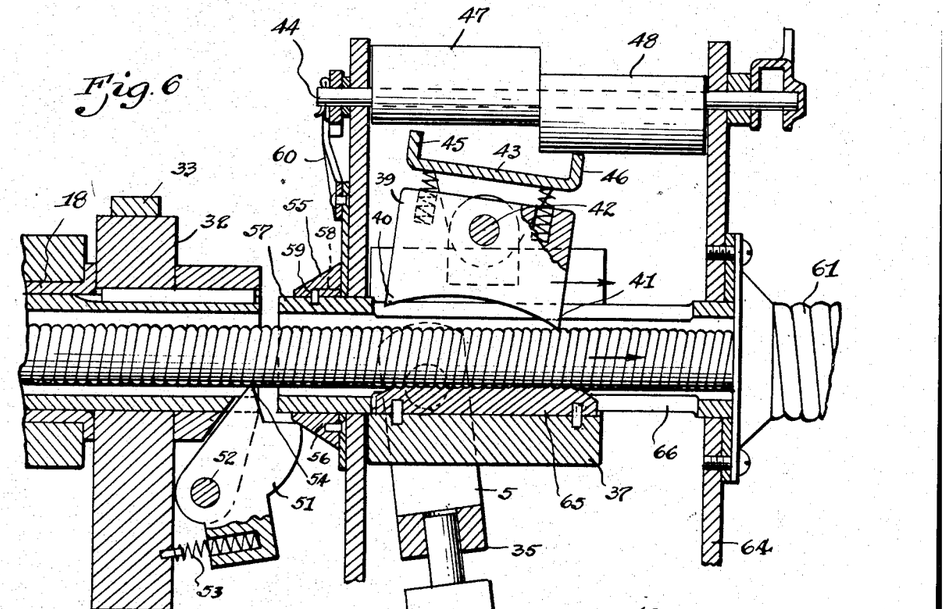
Fig. 6 is a view similar to Fig. 5 but showing the drive mechanism at the beginning of a forward stroke.
Figure 7:
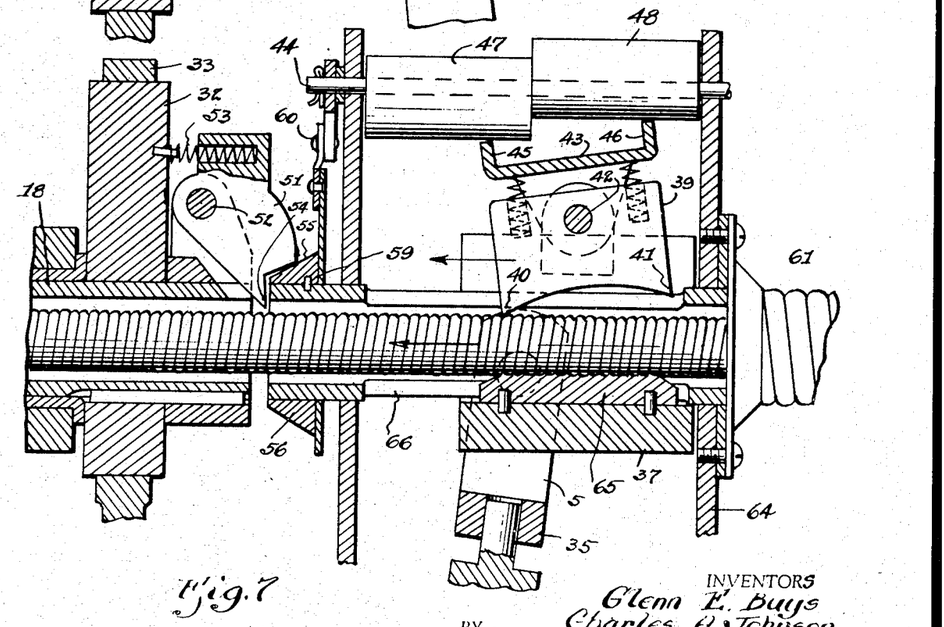
Fig. 7 is a view similar to Fig. 5 but showing the drive mechanism at the beginning of a reverse or retracting stroke.
Figure 8:
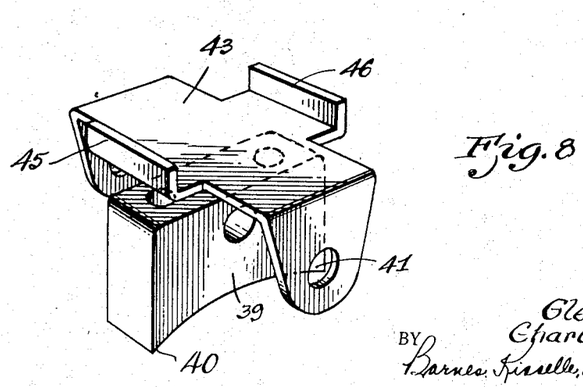
Fig. 8 is a perspective view of the cable-engaging dog.

Fig. 6 shows the dog 39 cammed down with the tooth 41 engaging a land in the flexible cable. Reciprocation of the sleeve 37 in the manner hereinabove described will, through shaft 42, reciprocate dog 39 which, by reason of the engagement of tooth 41 in the cable, cause the cable to move forward longitudinally into the pipe. When the sleeve has reached the limit of its forward stroke and begins to return, the tooth 41, which presents an inclined surface on its back face, will slide over the cable in a manner comparable to a ratchet. Repetition of these motions will cause periodic forward movement of the cable which is the intermittent motion referred to above. When it is desired to reverse the cable and retract it from the pipe back into the reel, the opposite end of the dog 39 is cammed down so that the tooth 40 engages the cable. The tooth 40 is inclined in a direction opposite to that of the tooth 41, and the motion will be similar but in reverse to that just described for feeding the cable into the pipe; that is, the cable will be retracted by the sleeve 37 but the dog will slide over the cable as the sleeve 37 advances to the right as shown in Fig. 7.

Figures 3, 4:
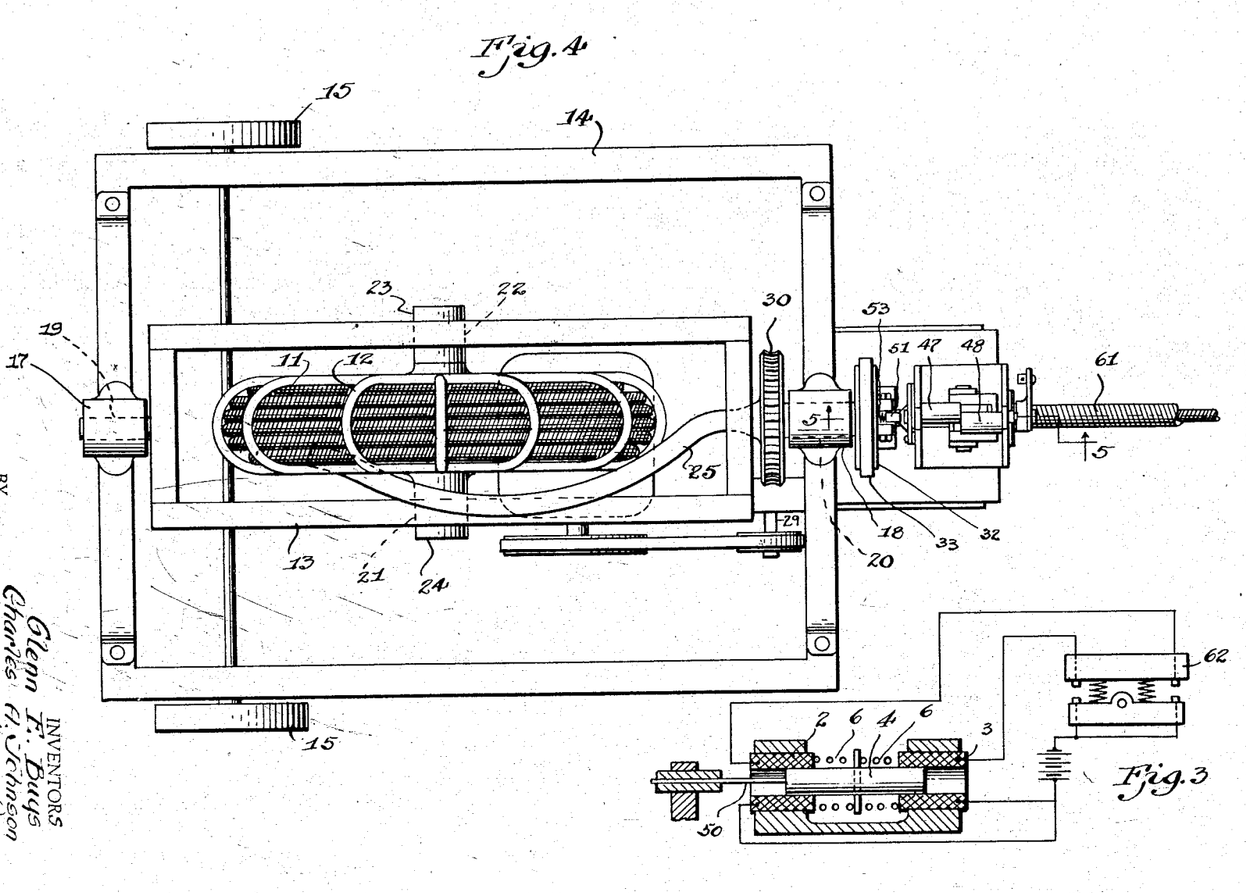
Fig. 3 is a diagrammatic view of the switch and solenoids which control the feeding means.
Fig. 4 is a plan view of the machine.

A means to selectively cam down the opposite ends of the dog 39 will be described. As illustrated in Figs. 5, 6 and 7 a shaft 44 is pivotally mounted above the dog 39 and plate 43. The plate 43 is provided with up-turned ends 45 and 46. Two off center cylindrical members 47 and 48 are keyed to the shaft 44. The members 47 and 48 are in plane although they are not co-axial. Rotation of the shaft 44 will therefore alternately present either the member 48 or 47 in a downward position. These members 47 and 48 are adapted to engage the ends 45 and 46 respectively of the plate 43 and thus cam the opposite ends of the dog 39 downward. The position of the cylindrical members 47 and 48 therefore determines the direction of the longitudinal movement of the flexible cable. Suitable control means to rotate the shaft 44 are provided in a flexible wire 50 eccentrically fastened to the shaft 44, and a core 4 fastened to flexible wire 50 and slidably mounted in solenoids 2 and 3 (see Fig. 3). Actuation of solenoids 2 or 3 will rotate shaft 44 in opposite directions. Springs 6 will return core 4 to neutral position. When the shaft 44 is rotated to a position where the cylindrical members 47 and 48 are in a horizontal plane neither of the ends 45 or 46 of plate 43 are engaged. This is the neutral or inoperative position shown in Fig. 5.

Figures 9, 10, 11, 12:
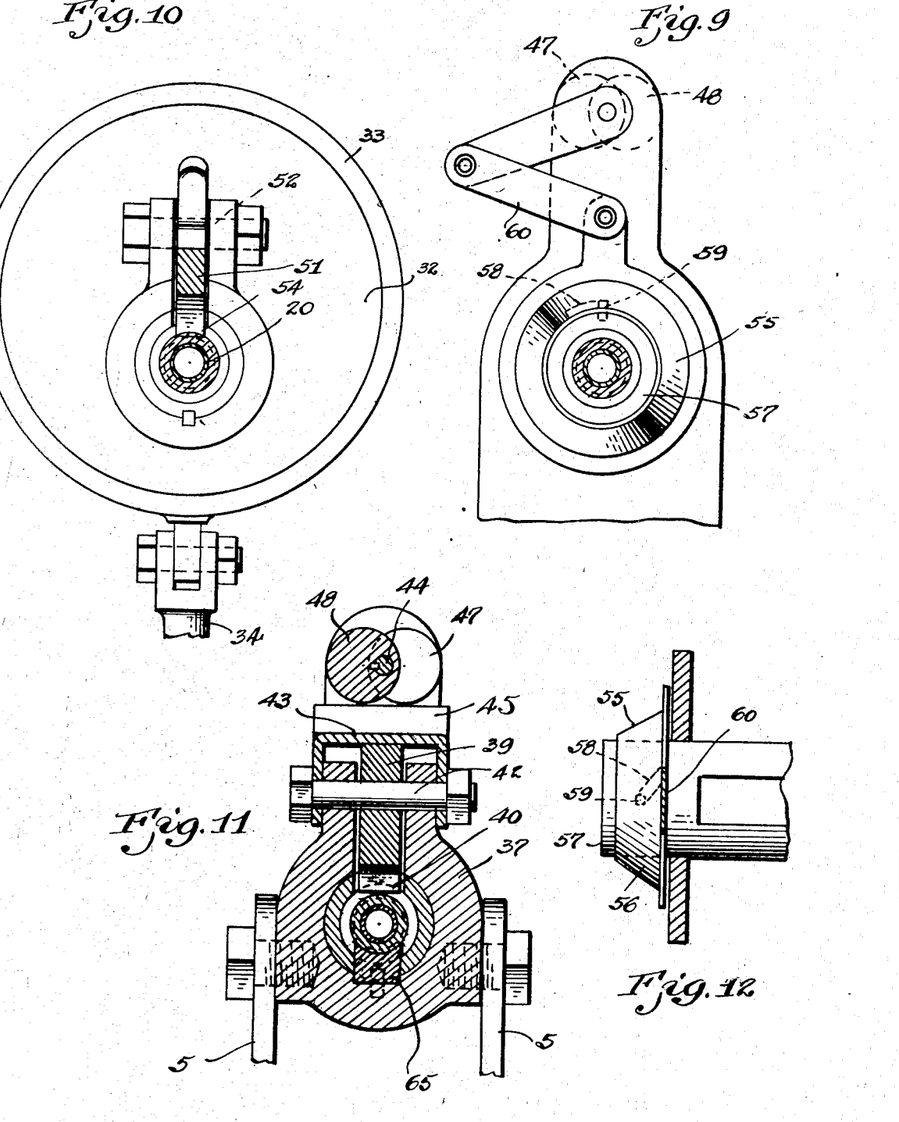
Fig. 9 is a view on the line 9—9 of Fig. 5.
Fig. 10 is a view on the line 10—10 of Fig. 5.
Fig. 11 is a view on the line 11—11 of Fig. 5.
Fig. 12 is a detailed view showing the mounting of the cam which controls the dog adapted to prevent the cable from being forced back into the reel when the cable encounters an obstruction.

A dog 51 serves the function of preventing return movement of the cable when it encounters an obstruction. The dog 51 resiliently permits the cable to be fed longitudinally past it into the pipe but prevents a reverse movement of the cable. This dog may be disengaged when it is desired to retract the cable from the pipe and rewind it upon the wheel. The dog 51 is pivotally mounted at 52 upon the rotating journal 20. A spring 53 acting between the eccentric 32 and dog 51 causes the dog to resiliently engage the cable with a tooth 54 inclined away from the reel 12. A frusto-conical surface 55 upon a ring 56 circumscribing a stationary sleeve 57 which is co-axial with the cable controls the dog 51. A slot 58 and key 59 cam the ring 56 longitudinally so that the surface 55 may disengage the tooth 54 when the ring is rotated. Suitable links 60 fastened to shaft 44 control the rotation of the ring 56 and, therefore, the engagement of the tooth 54. This linkage should be so arranged that the tooth 54 is only disengaged when the cylindrical member 47 is in its lowered position actuating tooth 40 to retract the cable. When the ring 56 is retracted, the spring 53 causes the tooth 54 to engage the cable.

A flexible conduit 61 co-axial with the sleeve 55 receives the cable from the feeding means. The moving cable is completely encased and the operator is protected from it. At a remote point upon the conduit 61 is mounted the control member 49 and an electric switch 62 which is connected to the solenoids 2 and 3 (see Fig. 3). A curved pipe 63, as illustrated in Fig. 2, extends from the control member to the entrance to the sewer or pipe. The switch 62 referred to is spring actuated so that when the switch handle is pivoted under the pressure of the operator's finger one of the solenoids is actuated and release of the operator's finger disconnects the solenoid and allows spring 6 to automatically neutralize cylindrical control members 47 and 48. This is a safety feature so that when the cutters engage an obstruction and the operator's attention and strength is required to hold the curved pipe 63 over the pipe entrance, he need not release his hands to find an additional push button to stop the longitudinal feed of the cable. A mere lifting of a finger neutralizes the driving means. The flexible conduit 61 permits the operator to direct the cable into the pipe.

The entire drive means is mounted within a U-shaped frame 64 which is removably carried by the supporting member 14. Removal of the U-shaped member 64 and its associated parts removes the entire drive means as an integral unit and these may be replaced as a unit.

An arcuate member 65 is mounted within the sleeve 37 and adapted to receive the lower side of the flexible cable. The member 65 has a serrated surface of the same pitch as the winding of the cable. The cable is therefore engaged by the tooth 40 or 41 on one side and the member 65 on the opposite side. The member 65 moves with the sleeve 37 and aids in the driving of the cable. A slot 66 is provided in the sleeve 57 to permit reciprocation of the member 65.

A modified form of drive means is shown in Figs. 13, 14, 15 and 16. The basic distinction in this driving means from that described above is that in the modified form the dogs or teeth which engage the flexible cable rotate with the cable and do not merely have a longitudinal movement. They are used to create longitudinal movement in the cable but freely rotate with it and do not resist its rotation. The cable is rotated in the same manner as described above.

Figures 13, 14:
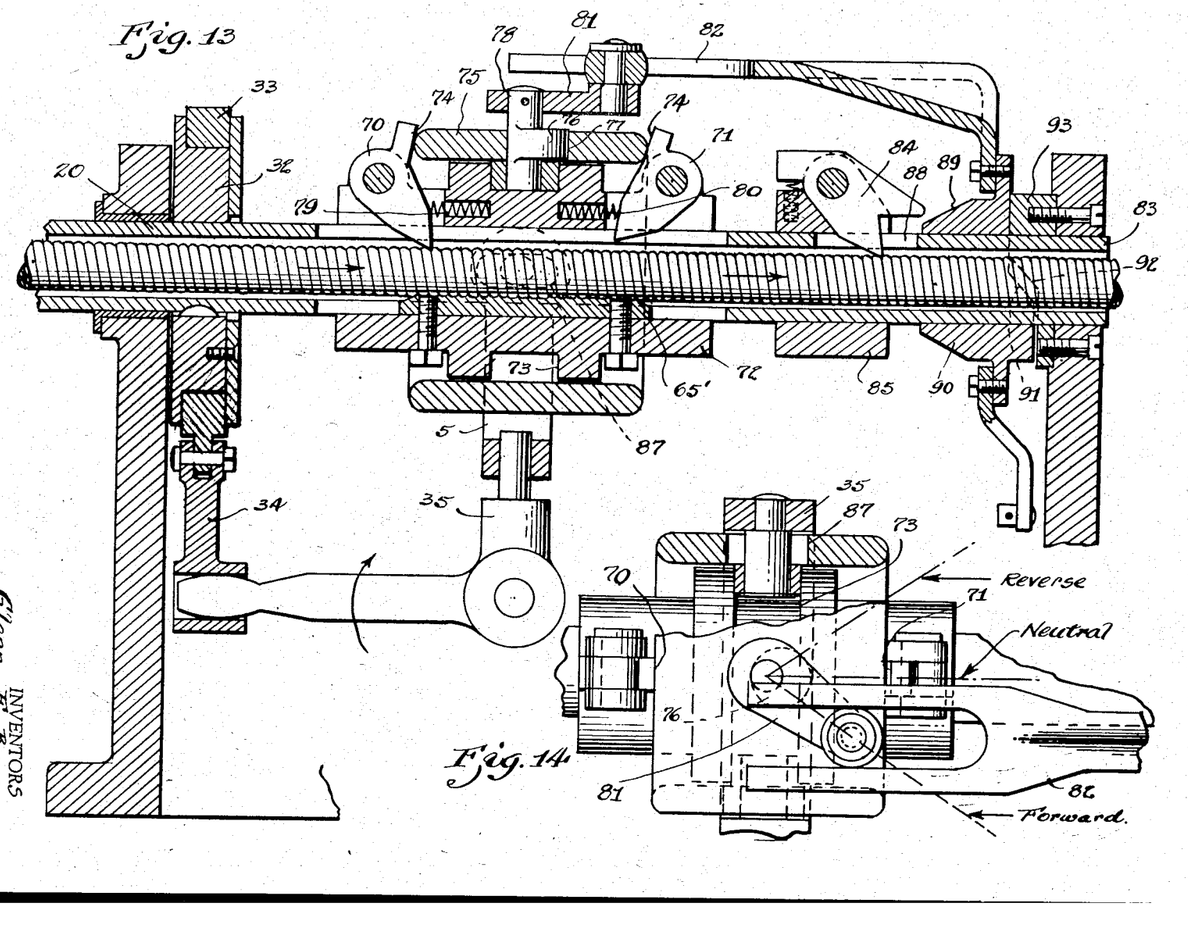
Fig. 13 is a vertical section of a modified form of the driving means showing this means driving the cable into the pipe.
Fig. 14 is a plan view of a portion of the device of Fig. 13.

A rotatable shaft or journal 20 and eccentric 32, ring 33, link 34 and bell crank 35 are provided as in the form described above to create a reciprocating longitudinal movement. The dogs 70 and 71 are, however, pivotally mounted in a rotatable sleeve 72 provided with the arcuate member 65 which engages one side of the cable. The sleeve 72 is provided with a circumferential cam slot 73 adapted to receive one end of the yoke 5 on the bell crank 35. Relative rotation between the sleeve 72 and bell crank 35 is thereby permitted and oscillation of the bell crank 35 reciprocates the sleeve 72. When one of the dogs 70 or 71 is in engaging relation with the cable the longitudinal reciprocation of sleeve 72 causes longitudinal movement of the cable in a manner similar to that described above in the principal form.

Figure 15:
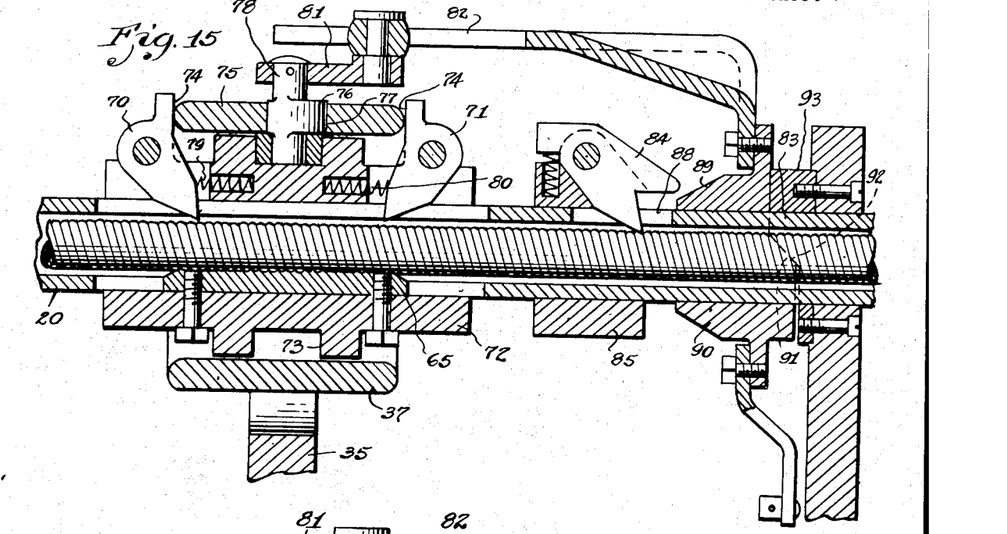
Fig. 15 is a view of the modified device similar to Fig. 13, but showing the drive means in an inoperative position.
Figure 16:
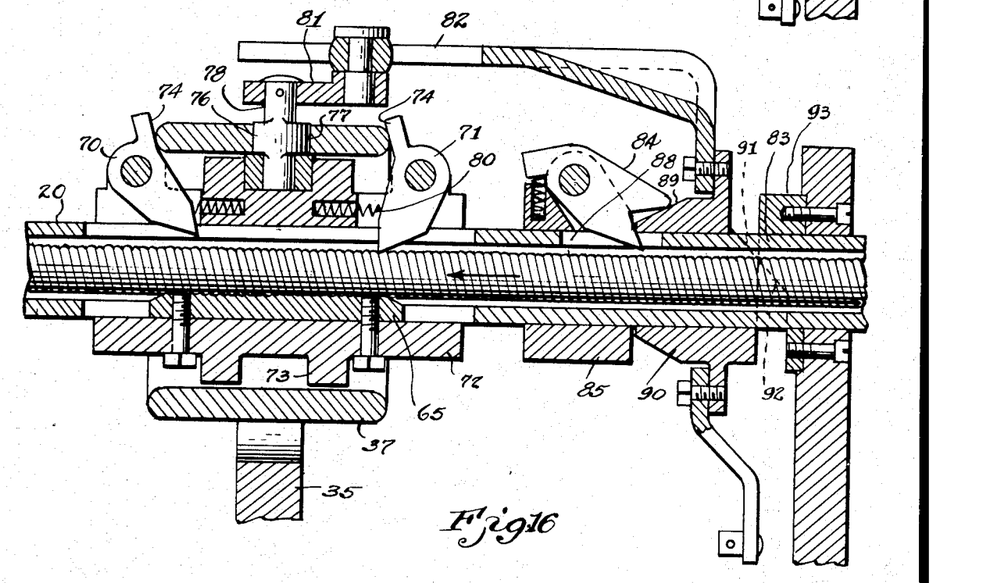
Fig. 16 is a view of the modified device similar to Fig. 13, but showing the drive means retracting the cable.

A selective means is provided to control the engagement of dogs 70 and 71. Fig. 13 shows the dog 70 engaging the cable and feeding the cable into the pipe or sewer. Fig. 15 shows the device in neutral or inoperative position with both of the dogs 70 and 71 disengaged from the cable. Fig. 16 shows the dog 71 engaging the cable and retracting the cable back into the reel. Each of the dogs 70 and 71 is provided with a cam surface 74. A cylinder 75 circumscribes the sleeve 72 and is positioned between and in abutting relation with the cam surfaces 74 of dogs 70 and 71. Cylinder 75 is provided with a suitable opening 87 which permits the bell crank 35 to enter cam slot 73. An eccentric 76 mounted on shaft 78 projects through an opening 77 in the cylinder 75 and permits axial movement of the cylinder 75 by rotation of the shaft 78. It is apparent, therefore, that the shaft 78 may be rotated to cause the cylinder 75 to engage either the dog 70 or the dog 71. Engagement of the cylinder with a dog causes the latter to be pivoted and disengaged from the cable. Coil springs 79 and 80 mounted in the sleeve 72 engage the dogs 70 and 71 respectively and urge them into engagement with the cable. The dogs 70 and 71 are inclined in opposite directions and therefore each has a sliding movement over the serrated surface of the cable in one direction and a drive in the opposite direction. A middle position is provided for cylinder 75 in which both dogs will be disengaged from the cable. This is an inoperative or neutral position. It is apparent that the sleeve 72 with the dogs 70 and 71 may freely rotate with the cable and relative to the cylinder 75.

A crank 81 is fastened to the shaft 78 and engaged by a fork 82. The opposite end of the shaft 78 is rotatably and slidably mounted in the cam slot 73. The fork 82 is rotatably mounted relative to a sleeve 83 surrounding the cable. Sleeve 83 is preferably an extension of journal 20. Slight rotation of the fork 82, therefore, rotates shaft 78 and provides a selective control for engagement of the dogs with the cable. A dog 84 is mounted in a housing 85 keyed to rotatable sleeve 83 and urged by spring 86 into resilient engagement with the cable. Dog 84 performs the same function as the dog 51 in the principal form described above. Sleeve 83 is provided with a slot 88 to permit the dog 84 to engage the cable. This dog is adapted to engage the cable at an angle inclined away from the cutting end of the cable and prevent the cable from being pushed back into the reel when the dog 70 is moving to the left in Fig. 13 and performing its ratchet motion. This occurs on the return of the sleeve 72 to its initial driving position. A frusto-conical cam surface 89 is provided on a ring 90 which surrounds the sleeve 83. The ring 90 is operatively connected to work member 82 and provided with a cam surface 91 adapted to engage a cam surface 92 on a stationary member 93. The frusto-conical cam surface 89 is adapted to engage the dog 84 and disengage the latter from the cable. It is apparent, therefore, that rotation of the fork 82 to selectively control the drive of the cable simultaneously rotates the ring 90 permitting cam surfaces 91 and 92 to engage and move the cam surface 89 into contact with the dog 84. These parts are so arranged that the dog 84 is disengaged from the cable only during the time that the dog 71 engages the cable to retract the same.

In the operation of this form of the device a reciprocating motion is given to sleeve 72 by rotation of the eccentric 32 and ring 33 which rock the bell crank 35. Crank 35 engages sleeve 72 in a circumferential cam slot. When the dog 70 is in engagement with the cable the reciprocation of sleeve 72 drives the cable into the pipe on motion from left to right of Fig. 13. On the return part of the reciprocation of sleeve 72 the dog 70 rides freely over the surface of the cable in a ratchet movement for the dog 70 on its back side does not prevent a sharp angle to the cable. Rotation of fork 81 may disengage the dog 70 and engage the dog 71. The same reciprocating motion of sleeve 72 will retract the cable when the dog 71 is in engagement therewith. Dog 84 which resiliently engages the cable prevents the latter from being forced back into the reel when the positive pressure of dog 70 is absent and the cable is being fed into the pipe. Sleeve 72, dogs 70 and 71 and housing 85 with dog 84 rotate freely with the cable. It is to be understood that the cable is rotated in the manner set forth with reference to the principal form.

A further modified form of the invention is shown in Figs. 17 through 22. The frame and reel members of this form of the invention are substantially identical to that previously described. The remote control and power means is also similar. A longitudinal movement of the cable is caused by means of pins 100. A plurality of pins 100 are slidably mounted through the face of a driving wheel 101. The pins are positioned in holes spaced about the arc of the circle in the face of the wheel 101. An idling wheel 102 is provided on the opposite side of the cable. Wheel 101 is keyed to a shaft 103 extending transversely of the direction of the feed of the cable. Wheel 102 is rotatably mounted on shaft 103. A cam surface 104 is provided upon the interior of a housing 105 enclosing the wheels and shaft 103. Openings are provided in the housing 105 to permit passage of the cable therethrough. As shaft 103 is rotated the pins 100 are cammed into engaging relation with the cable as they approach their uppermost position. As they rotate through a small angle in this uppermost position they cause a positive drive of the cable which is retained between the rotating driving and idling wheels.

Figures 18, 20, 21:
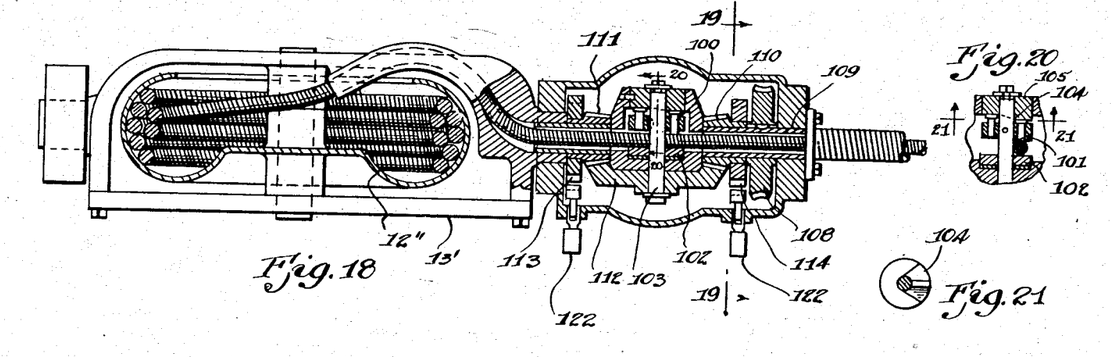
Fig. 18 is a horizontal section of the device shown in Fig. 17.
Fig. 20 is a section along the line 20—20 of Fig. 18.
Fig. 21 is a section on the line 21—21 of Fig. 20.

The means provided to cause rotation of the shaft 103 also permits the wheels 101 and 102 to rotate with the cable. A belt 106 connected to the power means rotates a worm gear 107 which is in engagement with the pinion gear 108. The pinion gear 108 is keyed to a sleeve 109 circumscribing the cable. Sleeve 109 is integral with housing 105. Bevel gears 110 and 111 are rotatably mounted on sleeve 109 on opposite sides of housing 105. A gear 112 is keyed to the shaft 103 and adapted to engage bevel gears 110 and 111. Toothed wheels 113 and 114 are keyed to the bevel gears 111 and 110 respectively. Means to selectively hold one of the toothed wheels 113 or 114 stationary is provided. It is apparent, therefore, that as the toothed wheel 114 is retained against rotation, the rotation of the pinion gear 108, the sleeve 109, and the housing 105 will cause the gear 112 to revolve around the bevel gear 110. The bevel gear 110 being held stationary imparts a rotation to the gear 112 and shaft 103. Referring to Fig. 18 it is seen that this rotation would be in a clockwise direction. The bevel gear 111 which is in engagement with the gear 112 would have no effect for it would be freely rotating and carried by gear 112. If, however, the toothed wheel 114 was freed and the toothed wheel 113 held stationary the same procedure would be followed except that the rotation would be in a counter-clockwise direction. Gears 110, 111 and 112 are not necessarily bevel gears.

Figures 17, 19, 22:
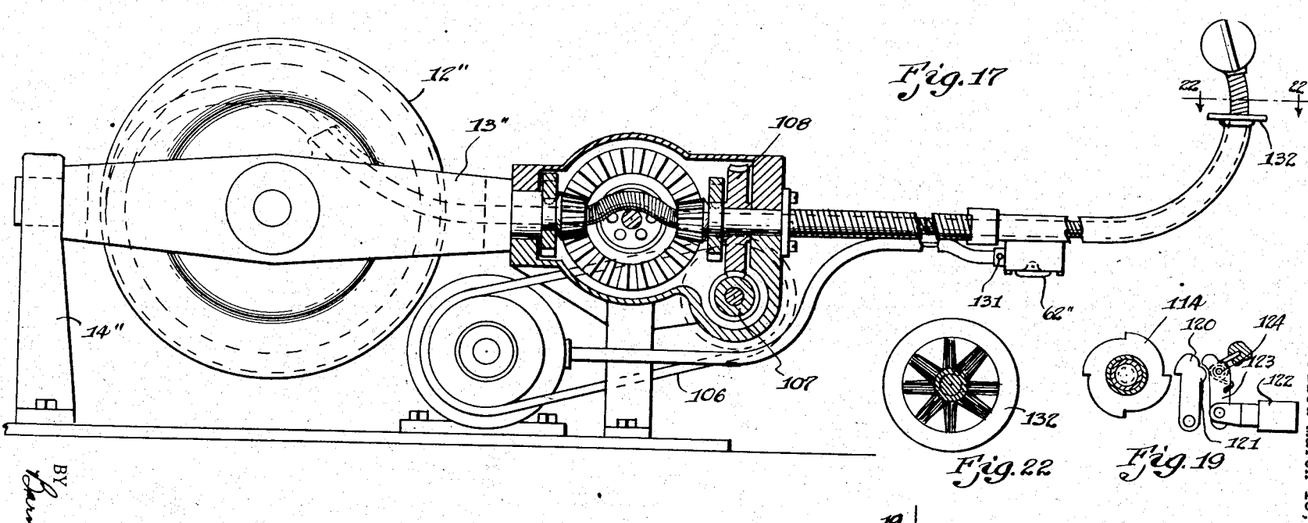
Fig. 17 is a vertical section of another modified form of the invention.
Fig. 19 is a section along the line 19—19 of Fig. 18.
Fig. 22 is a section on the line 22—22 of Fig. 17.

Illustrated in Fig. 19 is a means to selectively cause either the bevel gear 110 or 111 to be held stationary in the manner referred to. Fig. 19 shows the toothed wheel 114. A dog 120 is pivotally mounted upon a stationary object and adapted to engage the toothed surfaces of the wheel 114. Dogs 120 are provdied with a rounded cam surface 121. A solenoid 122 is adapted to rotate a bell crank 123 pivoted at 124. Actuation of the solenoid will, therefore, move dogs 120 into engagement with wheels 114 and lock the latter to the stationary object. A similar device is provided for toothed wheel 113. Therefore, selective actuation of the solenoids determines the direction of rotation of the cable. It should be noted, however, that the direction of rotation of the cable is the same whether the cable is being fed out of or into the reel.

The cable is bent around shaft 103 as shown in Fig. 1. As the housing 105 rotates a rotation is imparted to the cable retained between the wheels 101 and 102. The reel 12" is rotatably mounted in frame 13" which is rotatably mounted in a supporting member 14". This structure is similar to that described with reference to Fig. 1 except that the frame 13" is not power driven to cause rotation of the cable. It is freely rotatable and merely rotates as the cable unreels. The cable is guided from reel 12" by a guide 130 which is off the axis of frame 13". Longitudinal movement of the cable rotates frame 13" which in combination with the rotating housing 105 imparts rotation to the flexible cable.

A switch 62" similar to that described with reference to the principal form of the invention is used to control actuation of solenoids 122 and will thereby control the direction of motion of the cable. The wires leading from switch 62" in Fig. 17 may be connected with solenoids 122. A switch 131 controls the electric motor power means.

A circular brush 132, as shown in Figs. 17 and 22, provided with radially inwardly projecting bristles may be used to clean off the flexible cable as it is retracted from the pipe.

We claim:

1. A pipe-cleaning device comprising a support, a frame rotatably mounted in said support, a reel rotatably mounted in said frame having its axis of rotation at substantially right angles to the axis of rotation of said frame, a flexible cable in said reel, mechanical means to selectively impart step by step longitudinal motion in either direction to said cable, said mechanical means being co-axial with said rotatable frame and shiftable in a reciprocating motion in response to rotation of said frame, means to permit passage of said cable from said reel through the axis of said rotatable frame into said mechanical means and means to rotate said frame and said cable.

2. A pipe-cleaning device comprising a flexible cable, a cutting element on the end of said cable, a first means to selectively impart longitudinal motion in either direction to said cable, a second means to impart continuous rotation in one direction to said cable, power means to drive said first and second means, a hollow casing extending from said first means to encase said moving cable, said casing being provided with a flexible portion whereby the casing may be used to direct the flexible cable into the pipe to be cleaned and protect the operator from the moving cable, and a remote control mounted on said casing to control said first means, said control normally keeping said first means inoperative whereby release of the control by the operator stops the longitudinal motion of said cable.

3. A pipe-cleaning device comprising a support, a rotatable frame member pivotally mounted in said support, a rotatable reel pivotally mounted within said frame and having its axis at right angles to the axis of said frame, a flexible cable wound in said reel and having a free end extending therefrom axially of said frame, a first means to rotate said frame, and a second reciprocating pin means to impart longitudinal movement in two directions to said cable, and means enclosing said second means comprising an integral housing independent of said device except for a single mounting on said support whereby said second means may be detached and replaced as a unit when parts become worn.

4. A pipe-cleaning device comprising a flexible cable, means to rotate said cable, a first and second tooth, said teeth being oppositely inclined and adapted to be engaged with said cable, means to selectively engage said first tooth with said cable, means to reciprocate said first inclined tooth whereby as the tooth reciprocates the cable is driven in a first direction on one stroke and the tooth rides over the cable on the return stroke giving the cable an intermittent longitudinal movement, means to release said first tooth and engage said second tooth whereby said cable is driven in a second longitudinal direction.

5. A pipe-cleaning device comprising a flexible cable, means to rotate said cable, a sleeve circumscribing a portion of said cable, means to reciprocate said sleeve, a dog member pivoted in said sleeve, said dog member being provided with two teeth, means to pivot said dog member to selectively engage one of said teeth with said cable and means to cause said tooth to effect a drive of the cable, and means to cause said teeth to effect a drive of the cable in opposite directions when individually in engagement therewith.

6. A pipe-cleaning device comprising a supporting member, a frame pivotally mounted in said support member, a reel pivotally mounted in said frame, said reel having its axis of rotation at right angles to the axis of rotation of said frame, a flexible cable wound in said reel and projecting through the axis of rotation of said frame, means to rotate said reel and thereby rotate said cable, a sleeve member slidably mounted on said support and circumscribing a portion of said cable, means to reciprocate said sleeve member, a dog member pivotally mounted in said sleeve member, said dog member being provided with two oppositely directed teeth adapted to drive said cable in opposite directions when individually in engagement therewith, said teeth being adapted to individually engage the cable when said dog member is pivoted in opposite directions, whereby an intermittent longitudinal movement is imparted to said cable by the reciprocation of said sleeve member and the direction of movement is controlled by the pivoting of said dog member.

7. A pipe-cleaning device comprising a flexible cable, means to rotate said cable in one direction, a cylindrical sleeve slidably and rotatably mounted circumferentially of a portion of said cable, said sleeve being provided with a circumferential groove in the intermediate portion of said sleeve, a reciprocating member adapted to engage said groove and impart a reciprocating motion to said sleeve, dog members pivotally mounted in said sleeve on opposite sides of said intermediate portion of said sleeve, said dog members having oppositely directed teeth adapted to individually engage said cable and each adapted to drive said cable in one direction whereby said dogs transmit the reciprocation of said sleeve to intermittent longitudinal movement of said cable, while said sleeve and dogs freely rotate with said cable and means to selectively engage one of said dogs with said cable.

8. A pipe-cleaning device comprising a flexible cable, means to rotate said cable in one direction, a cylindrical sleeve slidably and rotatably mounted circumferentially of a portion of said cable, said sleeve being provided with a circumferential groove in the intermediate portion of said sleeve, a reciprocating member adapted to engage said groove and impart a reciprocating motion to said sleeve, dog members pivotally mounted in said sleeve on opposite sides of said intermediate portion of said sleeve, said dog members having oppositely directed teeth adapted to individually engage said cable and each adapted to drive said cable in one direction whereby said dogs transmit the reciprocation of said sleeve to intermittent longitudinal movement of said cable and said sleeve and dogs freely rotate with said cable, an eccentric pivotally mounted in said groove and adapted to alternately engage said dog members whereby movement of said eccentric selectively engages one of said dogs with said cable.

9. A pipe-cleaning device comprising a flexible cable, a sleeve slidably and rotatably mounted circumferentially of a portion of said cable, means to rotate said cable, means to reciprocate said sleeve, means carried by said sleeve to drive said cable when said sleeve moves in one direction, whereby an intermittent longitudinal motion is imparted to said cable and said sleeve rotates with said cable.

10. A pipe-cleaning device comprising a flexible cable, means to rotate said cable, an inclined tooth adapted to engage said cable, said tooth being mounted for rotation about the cable axis means to reciprocate said tooth whereby said cable is driven when said inclined tooth moves in one direction and an intermittent longitudinal motion is imparted to said cable and said tooth rotates with said cable.

11. A pipe-cleaning device comprising a flexible cable, a cutting element on the end of said cable, an idling wheel in one side of said cable, a driving wheel on the opposite side of said cable, said driving wheel being keyed to a shaft at right angles to said cable, a plurality of pins projecting through the face of said driving wheel and toward said cable, means to rotate said driving wheel, cam means to cause some of said pins to engage said cable and impart longitudinal motion to said cable, means to rotate said shaft in an axial plane whereby said cable is rotated.

12. A pipe-cleaning device comprising a flexible cable, a cutting element on the end of said cable, a housing having an opening through which said cable passes, a rotatable shaft in said housing at right angles to said cable, a driving wheel in said housing keyed to said shaft at one side of said cable, a plurality of pins projecting through the face of said wheel and toward said cable, a cam surface on said housing adapted to engage some of said pins with said cable as said shaft is rotated whereby longitudinal motion is imparted to said cable, a first gear on said shaft, a stationary second gear at right angles to said first gear and in engagement therewith and a means to rotate said housing whereby said shaft is rotated and said cable moved longitudinally and rotated.

13. A pipe-cleaning device comprising a flexible cable, a cutter element on the end of said cable, a housing having an opening through which said cable passes, a rotatable shaft in said housing at right angles to said cable, a driving wheel in said housing keyed to said shaft at one side of said cable, a plurality of pins projecting through the face of said driving wheel and toward said cable, a cam surface on said housing adapted to engage some of said pins with said cable as the shaft is rotated whereby longitudinal motion is imparted to the cable, a means of rotating said housing, a first gear on said shaft, a pair of gears rotatably mounted on opposite sides of said housing and each in engagement with said first gear, means to individually lock said pair of gears against rotation whereby when said housing is rotated in one direction said first gear engages with the locked gear to impart rotation to said shaft and longitudinal motion to the cable and release of said locked gear and locking of its mate reverses the longitudinal motion of the cable for the same rotation of the housing.

14. A pipe cleaning device comprising a support, a rotatable frame member pivotally mounted in said support, a rotatable reel pivotally mounted within said frame and having its axis at right angles to the axis of said frame, a flexible cable wound in said reel and having a free end extending therefrom axially of said frame, a first means to rotate said frame and a second reciprocating pin means to impart longitudinal movement in two directions to said cable.

15. A pipe cleaning device comprising a support, a frame rotatably mounted in said support, a reel rotatably mounted in said frame and having its axis of rotation at right angles to the axis of rotation of said frame, a flexible cable in said reel, power means to rotate said frame whereby said cable is rotated, a reciprocating means to impart step by step longitudinal movement to said cable and to selectively feed said cable out of said reel and return said cable to said reel.

16. A pipe cleaning device comprising a flexible cable, a cutting element on the end of said cable, means to impart a continuous rotation to said cable, a first reciprocating means to engage said cable and impart step by step longitudinal motion in a first direction to said rotating cable, a second reciprocating means adapted to engage said cable and impart step by step longitudinal motion in a second direction to said cable.

17. A pipe cleaning device comprising a flexible cable, a cutting element on the end of said cable, means to impart a continuous rotation to said cable, a first reciprocating means to engage said cable and impart step by step longitudinal motion in a first direction to said rotating cable, a second reciprocating means adapted to engage said cable and impart step by step longitudinal motion in a second direction to said cable and control means to selectively actuate said first and said second reciprocating means.

18. A pipe cleaning device comprising a flexible cable, means to rotate said cable, a member slidably mounted adjacent a portion of said cable, means to reciprocate said member, a first and a second tooth movably mounted in said member and adapted to engage said cable, selective means to individually engage said first and said second teeth with said cable, said first tooth being adapted to drive said cable during motion of said reciprocating member in a first direction and to slide relative to said cable during motion of said reciprocating member in a second direction, said second tooth being adapted to drive said cable when said member moves in said second direction and to slide relative to said cable when said member moves in the first direction whereby the selective engagement of the individual teeth with said cable will determine the direction of motion of said cable.

19. A pipe-cleaning device comprising a supporting frame, a flexible cable supported thereon, a cutting element on the end of said cable, a means to impart rotative movement of said cable, and a second means to impart selectively longitudinal movement to said cable, comprising a slidable cable engaging means, an eccentric member mounted to rotate with said cable, a means mounted on the frame to contact said member to derive reciprocatory movement therefrom, and means to translate the reciprocatory movement to said cable engaging means to effect longitudinal movement of the cable.

GLENN E. BUYS.
CHARLES A. JOHNSON.